Feb. 18, 1941.   P. L. BAILEY   2,232,303
SHATTER-RAY GLARE SHIELD
Filed Sept. 1, 1939
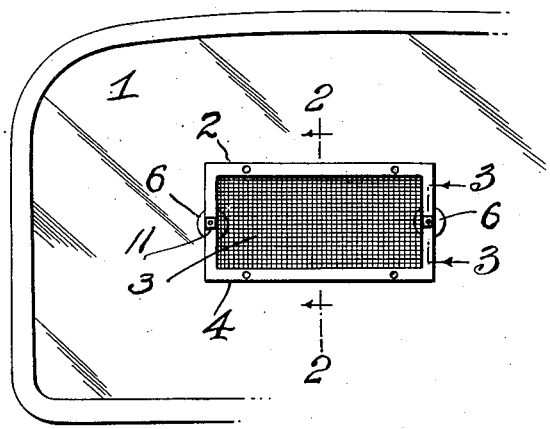
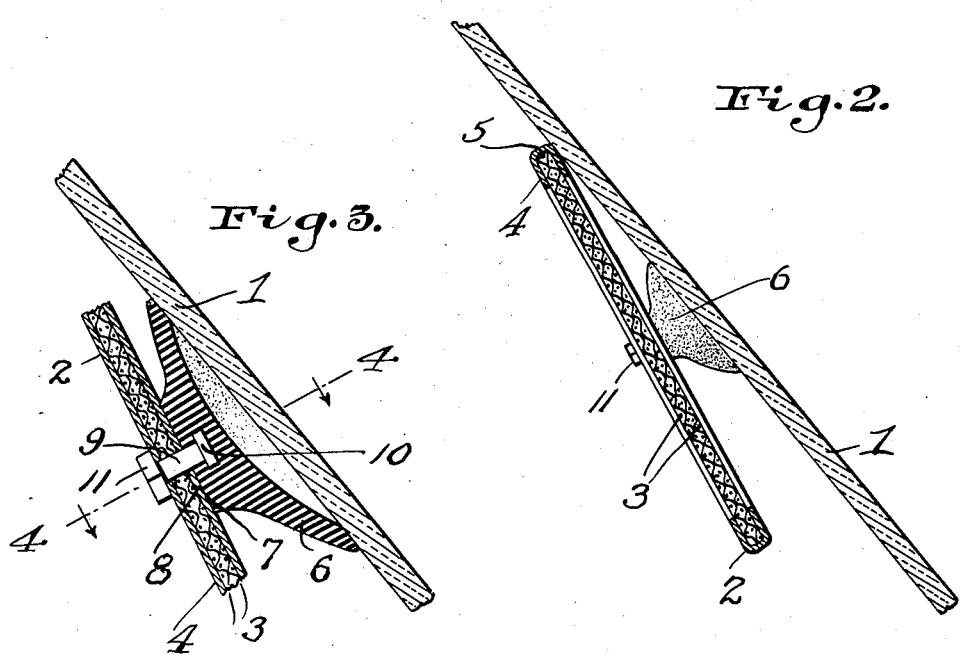
Inventor
Paris L. Bailey Patented Feb. 18, 1941

2,232,303

UNITED STATES PATENT OFFICE 2,232,303

SHATTER-RAY GLARE SHIELD

Paris L. Bailey, Indianapolis, Ind.

Application September 1, 1939, Serial No. 293,145

2 Claims. (Cl. 296—97)

My invention relates to glare shields for automobiles and other vehicles, and it consists in the novel features hereinafter described and claimed.

One object of the invention is to provide a shield of this character of simple and inexpensive construction which may be easily and quickly applied to or removed from a windshield or the like, which will be effectively held in position when applied, and which, while enabling the driver to see the road ahead, will protect his eyes against the glare of the headlights of approaching traffic, of the sun and of reflected light.

With the above and other objects in view the invention comprises a shield composed preferably of two superimposed, contacting sheets of woven wire screen having their edges secured in the channeled edges of a flat, substantially rectangular frame, and a pair of elastic rubber suction cups so constructed and arranged that they will not only support the shield frame but will press one of its longitudinal edges against the windshield to prevent the glare shield or screen from vibrating and causing the suction or vacuum cups to loosen their grip on the windshield.

In the accompanying drawing:

Figure 1 is an elevation of the glare shield applied to a windshield of an automobile or other vehicle.

Figure 2 is an enlarged detail sectional view on line 2—2 of Fig. 1.

Figure 3 is an enlarged detail sectional view on line 3—3 of Fig. 1.

Figure 4 is an enlarged detail sectional view on line 4—4 of Figure 3.

The preferred embodiment of the invention is illustrated in the drawing wherein 1 represents the windshield of an automobile or other vehicle, the glass of which is usually disposed in an inclined position, and 2 denotes the body of my improved glare shield. The latter is preferably composed of two sheets 3, 3 of woven wire such as is commonly used for fly screens. These wire mesh sheets are disposed in contact throughout their entire areas, and they are secured in a flat rigid frame 4 preferably of elongated rectangular shape and of any desired size. The bars or strips forming the frame 4 are channeled as shown at 5 and the edges of the strips 3, 3 are securely fastened therein in any suitable manner.

I have found that a glare shield formed of two thicknesses of such wire mesh screening is highly effective in breaking up and dispersing the bright light from approaching machines, the sun and other sources so that the driver's eyes are protected without loss of vision of the road ahead necessary for safe driving.

For mounting the glare shield on a windshield, I preferably employ the two elastic suction cups 6 secured to the front side of the frame 4 and preferably located on the longitudinal axis of the frame. The plane in which the edges of the cups 6 are disposed, upwardly converges with the glare shield at such an angle that when said cups are engaged with the windshield, the upper edge of said glare shield will be held tightly against said windshield as shown in Fig. 2, thereby effectively bracing the glare shield against quivering with respect to the windshield. In the preferred construction, I provide the cups 6 with flat rear sides 7 which converge upwardly with respect to the plane in which the edges of the cups are disposed, said sides 7 contacting with the front side 8 of the frame 4 in the present disclosure, as seen more particularly in Figs. 3 and 4. These contacting surfaces 7 and 8 are secured together in the present showing, by means of bolts 9 having heads 10 at their front ends embedded in the suction cups 6, said bolts projecting rearwardly beyond the surfaces 7 and at right angles thereto, extending through the glare shield, and being provided at their rear ends with nuts 11.

Due to the construction above described, the glare shield will be tightly held on the windshield against any quivering with respect to the latter, and it will be obvious that such quivering, if permitted, would interfere with vision through the glare shield and would eventually cause release of the suction cups from the windshield. It will also be observed that the glare shield is held in a more nearly vertical position than the inclined windshield, for better vision.

From the foregoing description taken in conjunction with the drawing it will be obvious that I have provided a simple, inexpensive and durable construction which may be quickly applied to any portion of the windshield and as easily removed therefrom, which will be securely retained in position without the use of bolts, screws, etc., and with only a minimum number of parts, and which will be highly efficient in preventing the driver from being blinded and confused by the glaring lights commonly met with while driving on highways of the present day.

Since excellent results have been obtained from the construction shown and described, such construction is preferably followed, but attention is called to the possibility of making variations within the scope of the invention as claimed.

Having thus described the invention what is claimed is:

1. A glare shield disposed behind an inclined windshield and having a rigid marginal frame, said glare shield and frame being disposed in a plane much more nearly vertical than said windshield to give better vision through said glare shield, the top bar of said rigid marginal frame being in contact with the rear side of said windshield, and suction cups secured to said frame and engaged with the rear side of said windshield, said suction cups holding said glare shield and frame in the aforesaid plane and tightly holding said top bar of said frame against the windshield to prevent quivering of said glare shield and frame.

2. A glare shield for disposition behind an inclined windshield, said glare shield having a rigid marginal frame, and suction cups secured to said rigid frame and projecting forwardly therefrom to engage the rear side of the windshield, the edges of said suction cups being disposed in a plane which upwardly converges with said frame and glare shield to cause said suction cups to hold said frame and glare shield in a plane much more nearly vertical than the windshield, allowing better vision through said glare shield, said suction cups being so related with said frame that they will tightly hold the top bar of said frame against the windshield to prevent quivering of said frame and glare shield.

PARIS L. BAILEY.